United States Patent [19]

Ricchio

[11] Patent Number: 4,637,737
[45] Date of Patent: Jan. 20, 1987

[54] APPARATUS FOR MEASUREMENT OF WATER CONDITIONS IN A WATERMATTRESS

[76] Inventor: Dominic A. Ricchio, 6021 56th Ave., Kenosha, Wis. 53142

[21] Appl. No.: 648,827

[22] Filed: Sep. 10, 1984

Related U.S. Application Data

[63] Continuation-in-part of Ser. No. 526,441, Aug. 25, 1983, abandoned.

[51] Int. Cl.[4] ............................................. G01K 1/14
[52] U.S. Cl. .................................... 374/141; 374/150; 5/451
[58] Field of Search .......................... 5/422, 451, 452; 116/216, 221; 215/11 A, 11 E, 230, 254, 365, 228; 219/217; 222/563; 374/141, 146, 150, 194, 205, 207, 151, 155; 220/212, DIG. 32, DIG. 16; 401/122

[56] References Cited

U.S. PATENT DOCUMENTS

| | | | |
|---|---|---|---|
| 1,390,666 | 9/1921 | Bolin | 374/194 |
| 1,581,480 | 4/1926 | Andersen et al. | 116/216 |
| 1,635,680 | 7/1927 | Manuel et al. | 374/194 |
| 1,871,527 | 8/1932 | Hurley | 374/146 |
| 2,547,337 | 4/1951 | McKeen | 215/11 A |
| 2,558,743 | 7/1951 | Ford | 374/207 |
| 2,648,226 | 8/1953 | Finch | 374/150 |
| 2,866,338 | 12/1958 | Muncheryan | 374/150 |
| 2,981,108 | 4/1961 | Andersen et al. | 374/150 |
| 3,146,806 | 9/1964 | Ginsburg | 401/122 |
| 3,195,545 | 7/1965 | Lederberg et al. | 401/122 |
| 3,335,893 | 8/1967 | Hanson | 215/354 |
| 3,842,675 | 10/1974 | Hunt | 374/207 |
| 3,849,814 | 11/1974 | Ross | 5/422 |
| 3,873,446 | 3/1975 | Campbell | 210/169 |
| 4,157,144 | 6/1979 | Weiler et al. | 215/365 |
| 4,233,492 | 11/1980 | McMullan et al. | 219/217 |
| 4,352,976 | 10/1982 | McMullan | 219/217 |
| 4,470,164 | 9/1984 | Soderstrom et al. | 222/563 |

OTHER PUBLICATIONS

"Industry's Guide to Waterbed Heaters," *Flotation Sleep Industry*, vol. 11, No. 4, Apr., 1983, pp. 14-15, 20-21.

Indvik, Kurt, "Heaters: The State of the Art and Marketplace," *Flotation Sleep Inc.*, vol. 11, No. 4, Apr., 1983, pp. 24-30, 34.

Lotus Advetrisement, *Health Care Systems*, Sep., 1983, p. 66.

Electrofilm, Inc., *The Heater Book*, vol. 4, Valencia, Calif., date unknown.

*Primary Examiner*—Charles Frankfort
*Assistant Examiner*—W. Morris Worth
*Attorney, Agent, or Firm*—Quarles & Brady

[57] ABSTRACT

An apparatus for measuring water temperature includes a temperature measuring instrument with a stem that is introduced into a water-filled mattress through a closure member positioned in the filler spout. The closure member and the temperature measuring instrument are secured in sealing relationship to the spout to form a blunt-ended cap therefor. The apparatus includes a cylindrical stopper that fits closely around an inside wall of the filler spout, a quantitative measuring instrument which includes a sensing stem and a crystal fitting over the end of the stopper and the filler spout for observing the measurements sensed by the instrument, and an annular hold-down member that runs around the crystal and the filler spout to secure the stopper in sealing relationship therewith.

8 Claims, 7 Drawing Figures

U.S. Patent   Jan. 20, 1987   4,637,737
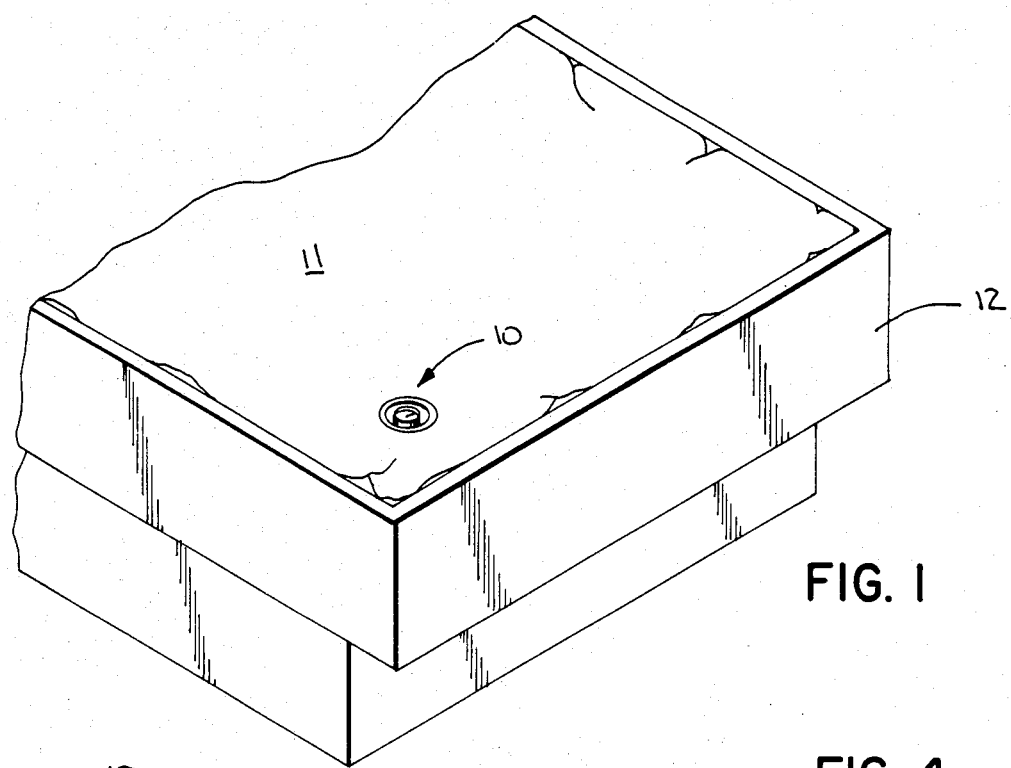
FIG. 1
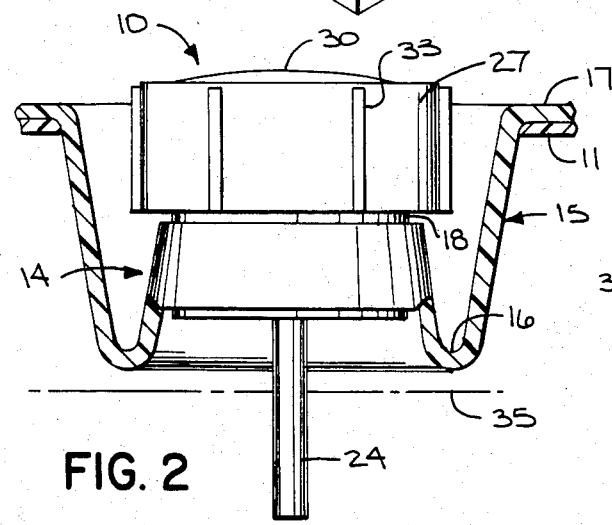
FIG. 2
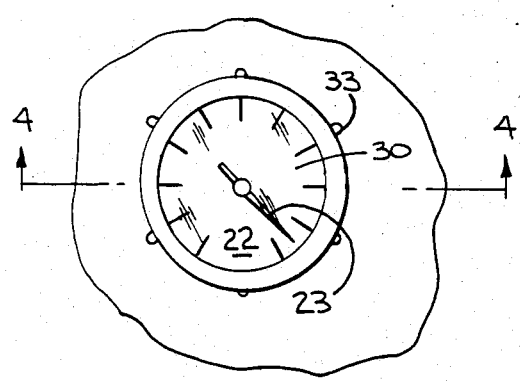
FIG. 3
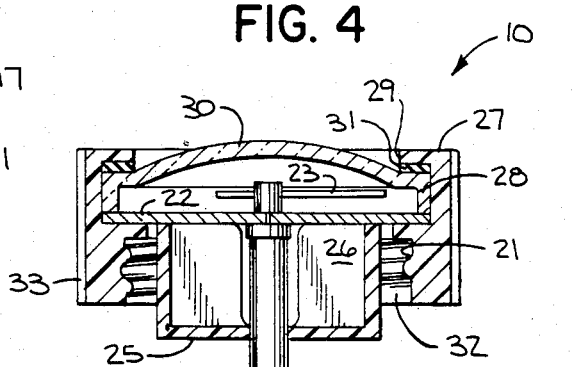
FIG. 4
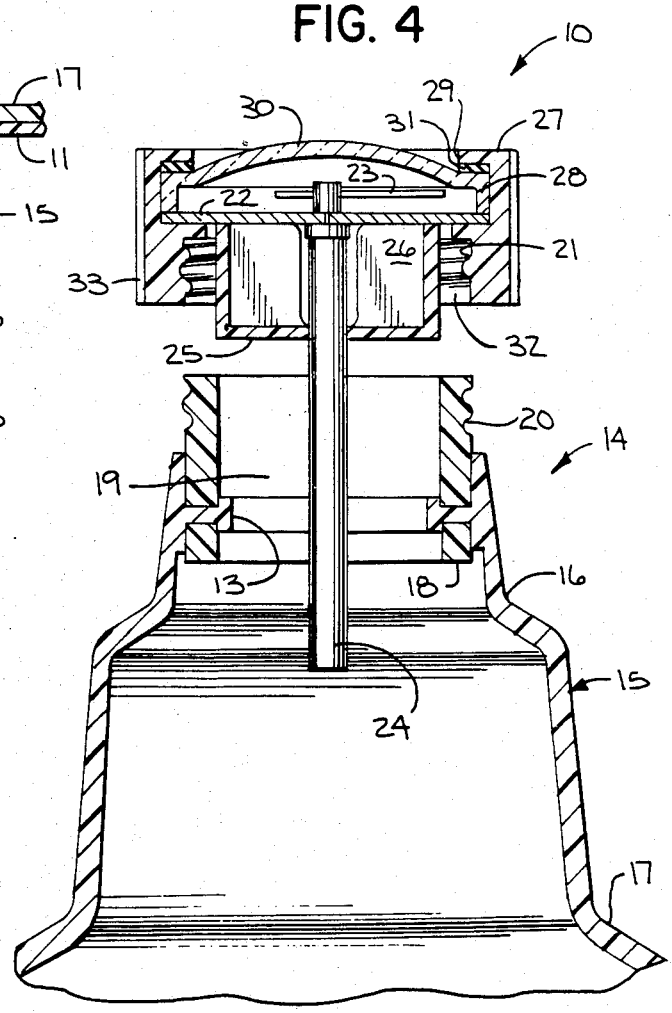

APPARATUS FOR MEASUREMENT OF WATER CONDITIONS IN A WATERMATTRESS

CROSS-REFERENCE TO RELATED APPLICATION

This is a continuation-in-part of my copending application Ser. No. 526,441 filed Aug. 25, 1983, abandoned.

BACKGROUND OF THE INVENTION

1. Field of the Invention

The invention relates to waterbed accessories.

2. Description of the Prior Art

Waterbed mattresses are generally filled with tap water which, depending upon locality and season, ranges from 50°-60° F. After standing for a length of time, the water in a water-filled mattress reaches average room temperature which, again depending on locality and season, may range from 60°-75° F.

For sleeping or other long periods of human occupation it is desirable for the temperature of the water in the watermattress to be raised closer to the temperature of the human body. Since skin temperature is normally a little lower than internal body temperature, a water temperature of 85°-88° F. is acceptable.

As a result of these temperature considerations, waterbeds are often sold with a unit for heating the water in the mattress. The controller for this heater typically has relative temperature control settings from 1 to 10. Even if more precise settings were provided, these would relate to the heater temperature rather than to the temperature of the mass of water within the mattress. There is therefore a need for a more precise indication of water temperature, from an instrument that is conveniently and inexpensively added to waterbed installations.

SUMMARY OF THE INVENTION

The invention is incorporated in a gauge for a watermattress that attaches to a filler spout in place of an original cap that comes with the spout.

The invention is also exemplified by a cap for protectively mounting a quantitative measuring instrument, such as a thermometer, within the neck of a filler spout.

The invention provides a device that can be easily added to existing watermattresses, is low in cost, and is maintained in place on the mattress until the next time the water in the mattress is changed or treated.

These and other objects and advantages of the invention will be apparent from the description that follows, and from the drawings, which are a part hereof and which illustrate the preferred embodiments of the invention. These examples, however, are not to be understood as the only embodiments of the invention, because the scope of the invention is defined by the claims, which may also encompass other embodiments which are equivalents of those described herein.

BRIEF DESCRIPTION OF THE DRAWINGS

FIG. 1 is a perspective, fragmentary view of a waterbed having a device that incorporates the invention installed near one corner of its mattress;

FIG. 2 is an elevation view of the device seen in FIG. 1;

FIG. 3 is a top view of the device seen in FIG. 1;

FIG. 4 is a sectional view of the device of FIG. 1, taken in the plane indicated by line 4—4 in FIG. 3;

DETAILED DESCRIPTION OF THE PREFERRED EMBODIMENTS

Figure 5:
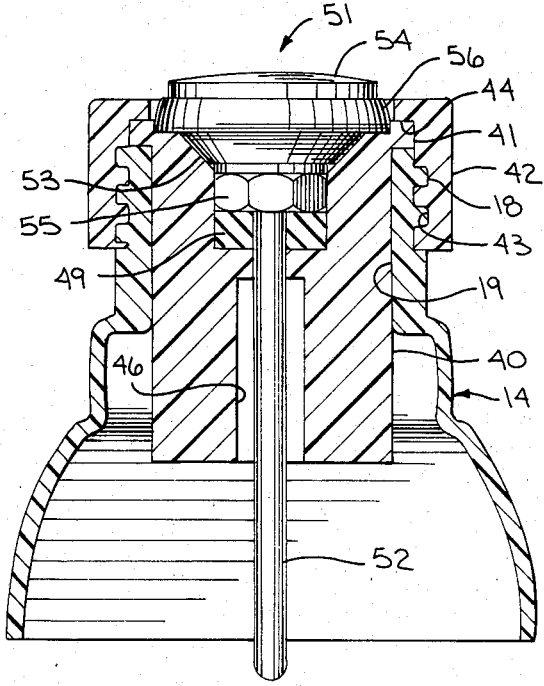
FIG. 5 is a sectional view of a second embodiment of the invention.

The invention is embodied in a gauge 10 in FIG. 1, which is installed in one corner of a water-filled mattress 11. The mattress 11 is a membraneous envelope of water-impervious material, typically polyvinylchloride (PVC). The mattress 11 is supported by a base and frame assembly 12 having sidewalls extending along and containing the expansion of the membraneous sides of the mattress 11.

As seen in FIG. 2, the gauge 10 is attached to a spout 14 which is used in filling the mattress 11 with water. The convenience provided by the invention will be better understood by considering the construction of the filler spout 14 in some detail.

The filler spout 14 is generally cylindrical in shape, and is made of a soft, flexible plastic, which is relatively thinner and more flexible in a portion forming a diaphragm 15 seen in FIGS. 2 and 4. The diaphragm 15 has a lower, bubble-like portion and an upper, neck portion which meet along a crease 16. The neck portion of the diaphragm 15 and the upper end of the spout 14 are of smaller diameter than the bubble-like portion, so that the upper end of the spout 14 can be pushed downward into the middle of the bubble-like portion to place the spout in the recessed position seen in FIG. 2. The spout 14 is attached to the mattress 11 along a flange 17 around the bottom of the diaphragm, as seen in FIG. 4, and when the spout 14 is in its recessed position, the spout 14 sits below this flange as seen in FIG. 2.

The diaphragm 15 has a smaller interior flange 13 (the thickness of which has been exaggerated in the drawing for a better view), to which an inlet tube 18 is bonded to extend the neck of the spout 14. A passageway 19 extends upwardly through the inlet tube 18 to an opening at the top. Around the outside of the upper end of the inlet tube 18, a spiralling groove forms a female thread 20 to engage a spiralling ridge that forms a male thread 21 on the gauge 10.

The gauge 10 is seen mounted around, and inside of, the spout inlet tube 18 in FIG. 2. The gauge 10 acts as both a closure for the spout and a mechanism for mounting a measuring instrument—in this case, a thermometer assembly for measuring water temperature—in a position where the thermometer is effective, is easily installed and does not interfere with normal usage of the watermattress.

As illustrated in FIG. 3, the thermometer assembly includes a temperature indicator that is provided by a round dial face 22 with an arcuately disposed scale and a needle 23 pivotably mounted at the center of the dial face 22 for movement over the range of the scale. The needle 23 is coupled through a temperature responsive movement to a temperature sensing stem 24 seen in FIG. 2. The thermometer assembly is contained within a hollow cap, except for the temperature sensing stem 24, which extends downwardly, beyond the bottom of the spout inlet tube 18. When the mattress 11 is filled and when the spout 14 is pushed down into its recessed position as seen in FIG. 2, a lower portion of the stem 24, long enough to sense temperature, is submerged beneath the waterline 35.

The details of the cap are seen best in FIG. 4, where a cup-shaped base portion 25 extends down into the passageway 19 like a plug, to close the tube 18 and prevent water from escaping from the mattress 11. This base portion 25 also helps maintain the round shape of the flexible inlet tube 18 as the cap is attached to it. Although it is preferred that the base portion 25 extend into the passageway 19 to accomplish these functions, the invention would still be operable in other embodiments with the closing portion of the cap merely extending over the opening into the top of the spout 14. For added support of its outer wall, the base portion 25 may include radially disposed webs 26 as seen in FIG. 4. The base portion 25 extends across the top rim of the spout to meet an annular (ring-shaped) portion 27 encircling the inlet tube 18.

The annular portion 27 of the cap extends both upwardly and downwardly from the opening into the spout 14. In an upper portion, a cavity 28 is formed to hold the dial face 22 and needle 23. A transparent convex protective cover 30, similar to a watch crystal, snaps into the cavity 28 through an opening 29 in the top of the cap. Just below a lip that runs around the opening 29, a seal 31 is formed by a waterproof adhesive or another material suitable for sealing around the edge of the cover 30. The cover 30 thus completes an enclosure around the dial face 22 and needle 23.

The annular portion 27 of the cap is spaced outwardly from the base portion 25 of the cap to form an annular recess 32 that receives the upper end of the spout inlet tube 18. A male thread 21 projects radially inward from the cap to engage the female thread 20 on the spout 14. The gauge is installed simply by screwing the unit onto the end of the spout 14. A knurl may be provided by ridges 33 formed on the cap parallel to its axis of rotation. This provides for a better grip on the cap when turning it. Other well-known systems of securing a cap to an open-ended spout could also be employed.

Figure 6:
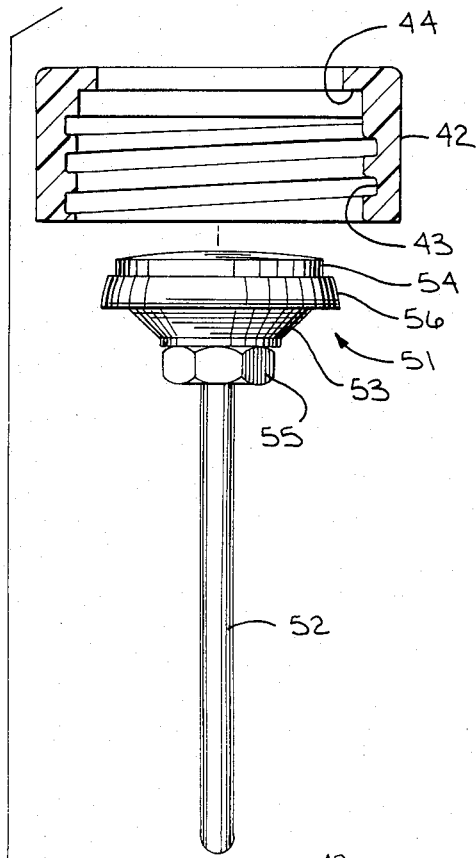
FIG. 6 is an exploded view of the device of FIG. 5.

The invention is also incorporated in a second embodiment shown in FIGS. 5 and 6. In FIG. 5, the closure member is a cylindrical stopper 40 of hard plastic that is inserted into the tubular end portion of the spout 14 and fits closely along the inside wall around passageway 19. Because the filler spout 14 is made of a soft, flexible plastic, the stopper 40 maintains the cylindrical shape of the upper portion of the spout 14. The stopper 40 has a lip 41 that fits over the top rim of the spout 14, and when held down, the lip 41 seals around the edge of the opening into the spout 14. The stopper 40 is held down by an annular cap member 42, which is turned onto the upper end portion of the spout 14 so that a female thread 43 on the inside of the cap member 42 engages the male thread 20 on the spout 14. The cap member 42 has a lip 44 that bears down on the lip 41 to hold the stopper 40 in its sealing position.

Referring to FIG. 6, the stopper 40 has a vertical bore 45 from the top and also a vertical bore 46 from the bottom which are separated by an inner wall 47 formed therebetween. The inner wall 47 has a hole 48 through it. An O-ring 49 of resilient material is sized relative to the bore 45 so that it becomes seated when pressed into the bottom of the bore 45. The bore 45 leads upward to an outwardly tapered opening, which leads further to a ledge 50 just inside the top entrance into the stopper 40.

A temperature measuring instrument 51 has a sensing stem 52 that slides through the open center of the sealing O-ring 49 and through the hole 48 in wall 47 and finally, through the lower bore 46 from which it extends from the stopper 42 into the water when the filler spout 14 is in its recessed position. The lower bore 46 is wider in diameter than stem 52 to allow water to contact a greater lengthwise portion of the stem 52 than would otherwise be possible with the stopper 40 not having the bore 46. Besides sealing around the stem 52 and the hole 48, the O-ring 49 is press fitted in the bore 46 and frictionally grips the stem 52 of the temperature measuring instrument 51 to prevent the stem 52 from sliding axially. The temperature measuring instrument 51 is of the dial-face type in which the temperature indicator is sealed in a metal case 53 with a plastic transparent crystal 54 over its top for viewing the temperature indicator. A hex nut 55 for calibration adjustment encircles the stem 52 below the case 53.

The temperature measuring instrument 51 in FIGS. 5 and 6 can be inserted either before or after the annular cap member 42 is attached to the spout 14 to hold down the stopper 40. This is made possible by the retention feature of the sealing O-ring 49. When the instrument is in place, an outer rim 56 of the metal case 53 is seated on the ledge 50 and the lip 44 of the annular cap 42 closes around the casing, but allows the instrument 51 to be moved upwardly through the middle open portion of the cap 42. As seen in FIG. 5, with the cap 42 securing the stopper 40, the crystal 54 rises only a slight amount above the cap 42 and provides a blunt-ended cap assembly for the spout 14. The diameter of the crystal 54 is about the same size as the spout opening to permit the largest possible dial-face for the temperature indicator.

Figure 7:
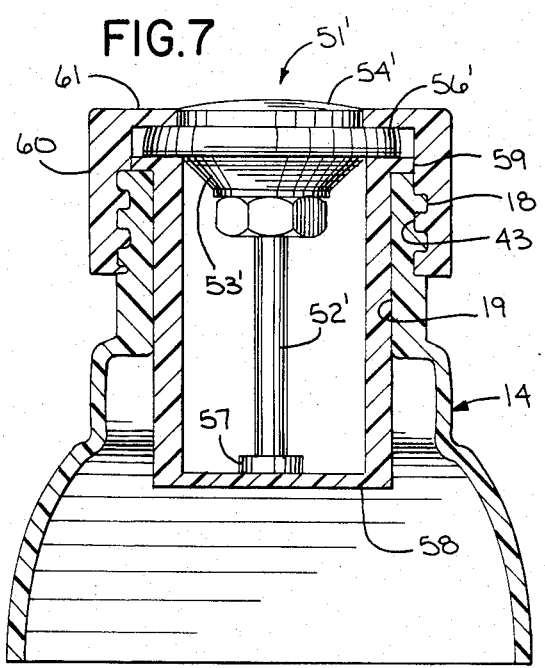
FIG. 7 is a sectional view of a third embodiment of the invention.

FIG. 7 shows a third embodiment of the invention where a temperature measuring instrument 51' has a temperature indicator, a plastic transparent crystal 54', a metal case 53' and a calibration hex nut 55' which are similar to those of the instrument 51 in FIGS. 5 and 6. The sensing stem 52' however, terminates in a flat-bottomed disk 57 which houses a coil. The disk 57 is enclosed by the bottom end of a hollow cylindrical stopper 58 of a shape similar to the stopper 40 in FIGS. 5 and 6. The stopper 58 also has an upper lip 59 to seal around the spout opening. The annular cap member 60 in this embodiment has a wider lip 61 extending a greater distance laterally inward from the upper rim of the cap member 60, so that it will bear on the outer rim 56' of the instrument case 53' which in turn bears on the lip 59 to seal the spout opening 14 when the cap member 60 is screwed down onto the spout 14. With the flat-bottomed sensing element 57, the instrument 51' is able to sense water temperature without directly contacting the water, so long as the lower end of the stopper 58 is submerged when the filler spout is in its recessed position.

It should be apparent that certain modifications could be made without departing from the principle invention. For example, although a "clock-face" or analog type instrument is disclosed, digital readout devices are also contemplated. And, while the preferred embodiment has described a temperature-sensing gauge, gauges for taking measurements of other fluid qualities are also contemplated. It should also be apparent that there are thermometer assemblies and other commercially available instruments that could be combined with the cap of the present invention, and the invention applies to both the cap itself and the cap in conjunction with such an instrument.

Having described the preferred embodiments of the invention, the following claims are made to define the legal scope of the invention.

I claim:

1. A gauge for quantitative measurement within a water-filled mattress of the type having an open-ended, recessable filler spout, the gauge comprising:

a cylindrical stopper that fits closely around an inside wall of the recessable filler spout of said water-filled mattress to maintain a cylindrical shape for the filler spout, wherein the stopper has an end that fits closely around the open end of the filler spout;

a quantitative measuring instrument with a sensing stem extending through the cylindrical stopper and with a crystal disposed above the end of the stopper to permit observation outside the mattress of measurements sensed by said instrument, wherein the sensing stem extends to a depth where the sensing stem is in thermal contact with the water when the filler spout is in a recessed position; and an annular hold-down member that runs around the crystal and the filler spout to secure the stopper in sealing relationship with the filler spout;

said cylindrical stopper, measuring instrument crystal and annualr hold-down member forming a blunt-ended cap with a profile that is non-interfering with use of the mattress when the recessable filler spout is moved to its recessed position.

2. The gauge of claim 1, further comprising self-retaining means in the stopper for gripping the sensing stem and providing a seal between the sensing stem and the stopper.

3. The gauge of claim 2, wherein the means retained in the stopper is an O-ring of resilient material.

4. The gauge of claim 1, wherein the annular hold-down member mounts the crystal for the quantitative measuring instrument.

5. The gauge of claim 1, wherein the annular hold-down member bears down on a portion of the quantitative measuring instrument that bears on the stopper to secure the stopper in sealing relationship within the filler spout.

6. The gauge of claim 1, wherein the quantitative measuring instrument has a crystal with a diameter about the same as that of the opening into the filler spout to permit observation of measurements made by said instrument.

7. A cap assembly for mounting a quantitative measuring instrument that includes a crystal in an open-ended, recessable filler spout on a water-filled mattress, the cap assembly comprising:

a cylindrical stopper that fits into the open end and closely around an inside wall of the recessable filler spout of said water-filled mattress to maintain a cylindrical shape for the filler spout;

an annular hold-down member that runs around the crystal and the filler spout to secure the stopper in sealing relationship with the filler spout; and means within the stopper for frictionally gripping the stopper and the quantitative measuring instrument to hold the quantitative measuring instrument within the cap assembly;

said cylindrical stopper, measuring instrument crystal and annular hold-down member forming a blunt-ended cap with a profile that is non-interfering with use of the mattress when the recessable filler spout is moved to its recessed position.

8. The cap assembly of claim 7 wherein the quantitative measuring instrument has a stem and wherein the means for frictionally gripping is an O-ring of resilient material.

* * * * *